United States Patent [19]

Byrne et al.

[11] Patent Number: 5,659,598
[45] Date of Patent: Aug. 19, 1997

[54] DUAL MODE SUBSCRIBER TERMINAL AND A HANDOVER PROCEDURE OF THE DUAL MODE SUBSCRIBER TERMINAL IN A MOBILE TELECOMMUNICATION NETWORK

[75] Inventors: John Byrne, Shepperton, Great Britain; Teuvo Järvelä, Helsinki; Sanna Mäenpää, Espoo, both of Finland

[73] Assignees: Nokia Telecommunications Oy, Espoo; Nokia Mobile Phones Limited, Salo, both of Finland

[21] Appl. No.: 454,131
[22] PCT Filed: Oct. 6, 1994
[86] PCT No.: PCT/FI94/00447
  § 371 Date: Jun. 8, 1995
  § 102(e) Date: Jun. 8, 1995
[87] PCT Pub. No.: WO95/10922
  PCT Pub. Date: Apr. 20, 1995

[30] Foreign Application Priority Data

Oct. 8, 1993 [GB] United Kingdom ............... 9320814.8

[51] Int. Cl.⁶ ............................ H04M 11/00; H04Q 7/38
[52] U.S. Cl. ........................ 455/436; 455/426; 455/553
[58] Field of Search ........................ 379/60, 59, 58; 455/33.2, 33.4

[56] References Cited

U.S. PATENT DOCUMENTS

| | | | |
|---|---|---|---|
| 4,893,327 | 1/1990 | Stern et al. ................ | 455/33.1 X |
| 5,127,042 | 6/1992 | Gillig et al. ................ | 379/59 |
| 5,247,701 | 9/1993 | Comroe et al. ............... | 455/33.4 |
| 5,260,988 | 11/1993 | Schellinger et al. ......... | 379/59 |
| 5,278,991 | 1/1994 | Ramsdale et al. ............ | 455/33.2 |
| 5,392,331 | 2/1995 | Patsiokas et al. ........... | 379/60 |
| 5,454,028 | 9/1995 | Hara et al. ................. | 379/61 |

FOREIGN PATENT DOCUMENTS

| | | |
|---|---|---|
| 2225512 | 5/1990 | United Kingdom . |
| 9316549 | 8/1993 | WIPO . |

*Primary Examiner*—Dwayne Bost
*Assistant Examiner*—Scott Richardson
*Attorney, Agent, or Firm*—Cushman, Darby & Cushman Intellectual Property Group of Pillsbury, Madison & Sutro LLP

[57] ABSTRACT

A dual mode terminal is provided, in which a mobile station of a mobile radio system and a cordless telephone are combined. This kind of terminal may have a connection with both a base station of the mobile radio system and a fixed part of the cordless telephone system. Handover may imply the transfer of a call from a fixed part of the cordless telephone system having a terminal-initiated handover to a base station of the mobile radio system having a network-initiated handover. In order to carry out a proper handover procedure, the cordless telephone part obtains from the mobile station part of the terminal measurement results relating to received signal strengths of the mobile system base stations in the neighborhood. The cordless telephone part of the terminal forwards these measurement results via a fixed part of the cordless telephone system to the mobile exchange of the mobile system in a handover request message. The mobile exchange selects a proper base station for handover and informs the mobile station part of the terminal about the identity of the selected base station via the cordless telephone part.

5 Claims, 2 Drawing Sheets

DUAL MODE SUBSCRIBER TERMINAL AND A HANDOVER PROCEDURE OF THE DUAL MODE SUBSCRIBER TERMINAL IN A MOBILE TELECOMMUNICATION NETWORK

BACKGROUND OF THE INVENTION

The invention relates to a mobile telecommunications system including a fixed network comprising mobile exchanges, base stations for mobile stations, and cordless telephone base stations connected to and under control of the mobile exchanges. In particular, the present invention relates to a method for performing handover from the cordless telephone base stations to base stations for mobile stations.

Conventional cordless telephones operate as an extension to the Public Switched Telephone Network (PSTN). A cordless telephone system consists of a portable handset and a base station (a fixed part) connected to PSTN. The first cordless telephone systems were analog systems, such as CT1. Recently digital cordless telephone systems, such as CT2 and DECT (Digital European Cordless Telephone) have been introduced. When a cordless telephone is a subscriber of PSTN, a cordless telephone is accessed by dialing the telephone number associated with the fixed subscriber connection to which the base station is connected. Also, the subscriber has access to the PSTN only via the home base station. In CT2 and DECT, also a telepoint service is introduced, whereby a subscriber to the service can make calls away from home via a public base station. Also, a common air interface for cordless telephones was introduced to facilitate roaming between systems and so to improve service coverage for the use.

There has also been a proposal to combine a cordless telephone system with a cellular mobile telecommunications system to further improve the roaming capabilities by means of utilization of the mobility control of the cellular network. When combined with the mobile telecommunications systems, the roaming of the cordless telephone handsets within the cordless telephone systems is fully supported. However, the cordless telephone handset is not able to utilize the more extensive radio coverage of the supporting cellular network or to perform handover to or from the cellular network. This disadvantage is due to several reasons.

Firstly, the radio interfaces of cordless telephone systems and the mobile radio systems are usually incompatible.

Secondly, the handover procedures are different. In cordless telephone systems, the handover procedure is usually initiated by the portable terminal. More particularly, when a cordless telephone terminal considers it necessary to change from one base station to another, the terminal scans the frequency band and selects the appropriate base station for the handover. In most of the mobile telephone systems, the handover is controlled by the network. The mobile station only measures the quality of the radio connection and forwards the measuring results to the fixed network. One of the network elements, for example a mobile exchange, makes a decision for handover on the basis of the obtained information.

SUMMARY OF THE INVENTION

It is an object of the invention to provide a subscriber terminal capable of communicating with both a fixed part of a cordless telephone system and a base station of the mobile radio system.

It is a further object of the invention to provide a method for performing handover from a fixed part of a cordless telephone system to a base station of a mobile telecommunications system.

One aspect of the invention is, in a mobile telecommunications system including a fixed network comprising mobile exchanges, first base stations connected to the mobile exchanges, and second base stations of a cordless telephone system, the second base stations being connected to and under control of the mobile exchanges, dual mode subscriber terminals having a mobile station part for radio communication with said first base stations and a cordless telephone part for radio communication with the second base stations; a method for performing handover from one of the second base stations to one of the first base stations, comprising the steps of:

measuring field strengths of said first base stations at the mobile station part of the dual mode terminal and storing measurement results, detecting low quality of connection between one of the second base stations and the cordless telephone part of the dual mode terminal during an on-going call, obtaining the stored measurement results from the mobile station part to the cordless telephone part of the dual mode terminal, sending a message including the obtained measurement results and terminal identity to the one of the second base stations by the cordless telephone part of the dual mode terminal, sending a handover request message from the one of the second base stations to one of the mobile exchanges in response to receipt of the message including the measurement results, the handover request message including the terminal identity and the measurement results, selecting one of the first base stations on the basis of the measurement results, sending a handover command message to the one of the second base stations from the one of the mobile exchanges, the message including the information of the selected one of the first base stations, sending a message to the cordless telephone part of the dual mode terminal from the one of the second base stations, the message including information of the selected one of the first base stations, forwarding the information of the selected one of the first base stations to the mobile station part from the cordless telephone part of the dual mode terminal, establishing a connection between the mobile station part of the dual mode terminal and the selected one of the first base stations, releasing the connection between the cordless telephone part of the dual mode terminal and the one of the second base stations.

Another aspect of the invention is a mobile telecommunications system including a fixed network comprising: mobile exchanges, first base stations connected to the mobile exchanges and second base stations of a cordless telephone system, the second base stations being connected to and under control of the mobile exchanges; a dual mode subscriber terminal comprising a mobile station part for radio communication with the first base stations, a cordless telephone part for radio communication with the second base stations, means for measuring field strengths of the first base stations at the mobile station part of the dual mode terminal and storing measurement results, means for monitoring quality of connection between one of the second base stations and the cordless telephone part of the dual mode terminal during an ongoing call, means for requesting the stored measurement results from the mobile station part to the cordless telephone part of the dual mode terminal in response to detecting low quality of the connection, means for sending a message including the obtained measurement results and a terminal identity to the one of the second base stations from the cordless telephone part of the dual mode terminal, means for receiving a message at the cordless telephone part of the dual mode terminal from the one of the second base stations, the message including information on the one of the first base stations which is selected for handover, means for forwarding the information of the selected one of the first base stations to the mobile station part from the cordless telephone part of the mode terminal so as to establish a connection between the mobile station part of the dual mode terminal and the selected one of the first base stations.

In the invention, a dual mode terminal is utilized, in which a mobile station of a mobile radio system and a cordless telephone are combined. This kind of terminal can have a connection with both a base station of the mobile radio system and a fixed part of the cordless telephone system. Handover in the case of this dual mode terminal can imply the transfer of a call from a fixed part of the cordless telephone system to a base station of the mobile radio system. As noted before, the primary problem in this concept is that two systems utilizing different handover principles are combined. In the cordless telephone systems, such as DECT, handover is a terminal controlled procedure and the terminal will make a decision when the handover is needed. In the mobile radio system, such as GSM, the network will always decide when to perform a handover.

In the present invention, the cordless telephone part of the dual mode terminal will initiate the handover procedure from a cordless telephone system to a mobile radio system, when the cordless telephone part of the dual mode terminal recognizes that the quality of connection is getting worse and the mobile radio system could offer a better connection. In order to carry out a proper handover procedure, the cordless telephone part obtains, from the mobile station part of the terminal, measurement results relating to received signal strength of the mobile system base stations in the neighborhood. The cordless telephone part of the terminal forwards these measurement results via a fixed part of the cordless telephone system to the mobile exchange of the mobile system in a handover request message. The mobile exchange selects a proper base station for a handover and informs the cordless telephone part of the terminal about the identity of the selected base station via the fixed part of the cordless telephone system. The cordless telephone part of the terminal forwards the identity of the base station to the mobile station part of the terminal which initiates an establishment of a connection with the selected base station. After the establishment of the connection is completed, the mobile station part informs the cordless telephone part about the matter and the latter releases the radio path of the cordless telephone system. Thus, the invention allows a terminal-initiated handover from a cordless telephone system to a mobile system which utilizes a network-initiated handover procedure.

BRIEF DESCRIPTION OF THE DRAWINGS

The description of the preferred embodiments of the invention will now be made with reference to the attached drawings, in which.

DETAILED DESCRIPTION

In the following, the invention will be described using a digital cellular radio system known as GSM (Groupes Speciale Mobile) as an example of the mobile radio system, and DECT (Digital European Cordless Telephone) as an example of cordless telephone systems. However, the invention is not intended to be restricted to these systems. The invention may be applied to any mobile radio system.

Figure 1:
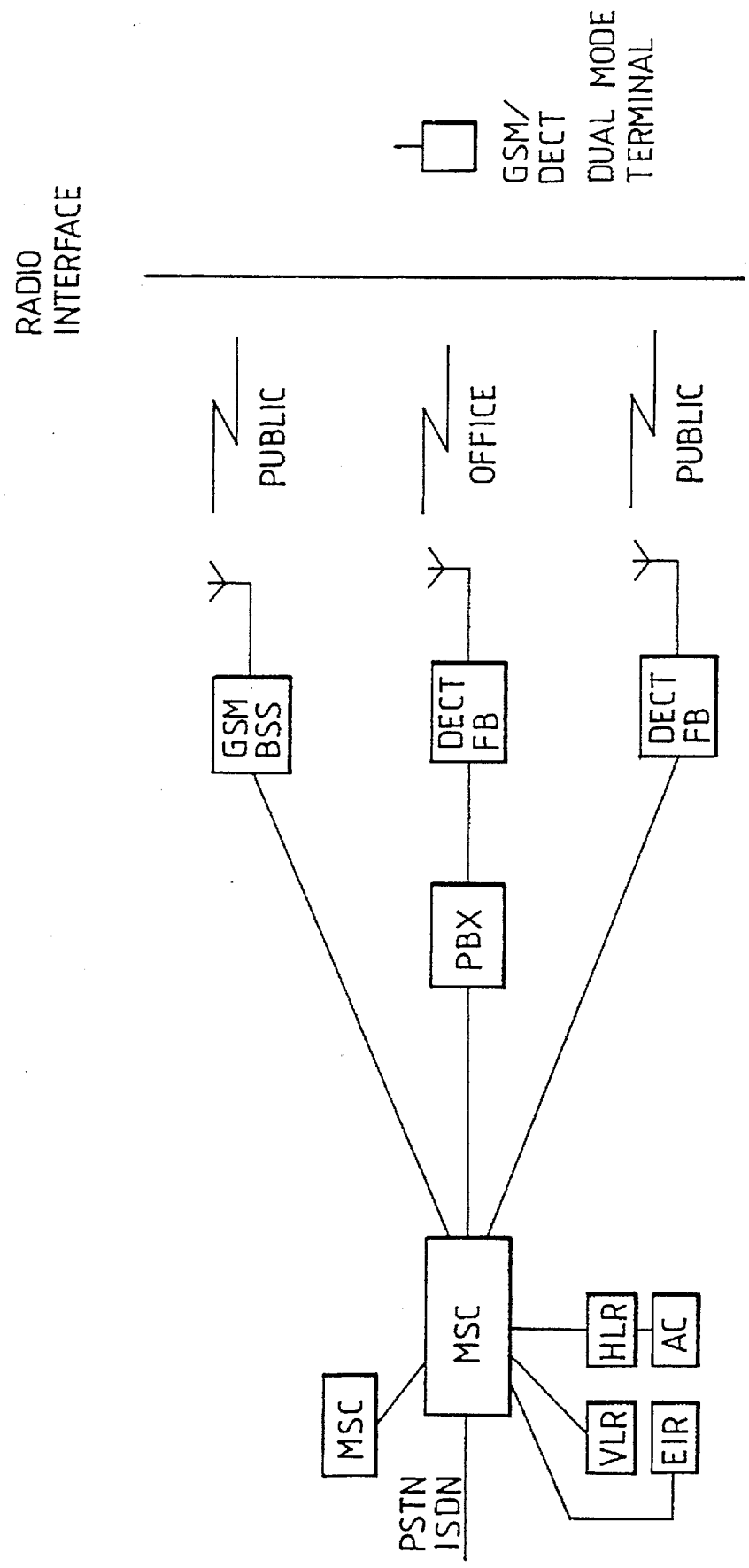
FIG. 1 shows a general diagram of a mobile radio system which supports a cordless telephone system.

FIG. 1 shows the functional environment of a GSM/DECT dual mode terminal. In FIG. 1, both base stations BSS of the GSM system and fixed parts FP of the DECT system are connected to the GSM mobile exchange MSC. One of the DECT fixed parts FP is shown to be connected to the private branch exchange PBX which is further connected to the MSC. The MSC may be connected to other MSCs, a PSTN (Public Switched Telephone Network) or an ISDN (Integrated Services Data Network). The MSC is also connected to the visitor location register VLR, which is a data base maintaining subscriber files on the subscribers visiting in the area of the MSC, and to a home location register HLR which is a data base maintaining subscriber files on all the subscribers in the system, and further to an authentication center AC and to an equipment identity register EIR. For a more detailed description of the operation and structure of the GSM system, reference is made to GSM specifications and to a book "The GSM system for mobile communication", M. Mouly and M. Pautet, Palaiseau, France, ISBN:2 9507190-0-7.

Figure 2:
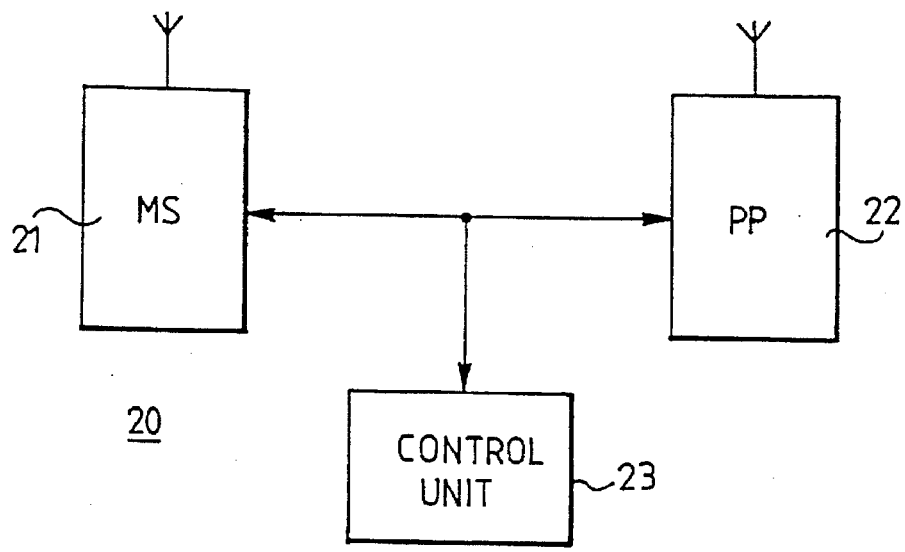
FIG. 2 shows a general diagram of a dual mode subscriber terminal according to the invention.

FIG. 2 shows a general view of a GSM/DECT dual mode subscriber terminal according to the invention. The terminal 20 consists of a GSM mobile station part MS 21 and a DECT portable terminal part PP 22. The GSM part of the dual mode terminal MS is used when communicating with GSM base stations. The DECT part PP of the dual mode terminal is used when communicating with DECT fixed parts FP. Both MS and PP include all the necessary equipment, such as radio transceivers, for signalling and communicating over the respective radio interface. It is normally advantageous to embody at least some functions and circuits, such as display, keyboard, power supply, etc., by means of a common circuitry. In FIG. 2, a common control unit 23 is connected to the MS and PP parts of the dual mode terminal for controlling the operation thereof.

The GSM network provides a full mobility management support for the cordless telephone systems connected to it. Thus, the GSM network maintains files on the cordless telephone subscribers and the current location thereof and is therefore able to route the calls addressed to the cordless telephone to their current locations. Basically, the cordless telephone subscribers are handled in a similar manner with the ordinary GSM subscribers.

Thus, the dual mode terminal according to the invention is capable of communicating with both GSM base stations and DECT base stations (fixed parts) FP. Consequently, a dual mode terminal should also be able to roam anywhere in the system. However, problems are encountered when the handover from a DECT fixed part (or vice versa) is required, since in the DECT system handover is a terminal controlled procedure and the terminal will make a decision when the handover is needed. In the GSM system, the network will always decide when to perform a handover.

An example of the handover procedure according to the invention from a DECT fixed part to the GSM base station will be described in the following with reference to FIG. 3. Firstly, it is assumed that the cordless telephone part PP of the dual mode terminal has a DECT connection and is engaged in an on-going call via the fixed part FP of the DECT system. The mobile station part MS of the dual mode terminal is simultaneously measuring the signal strength of the neighboring GSM base stations and stores the measurement results.

Figure 3:
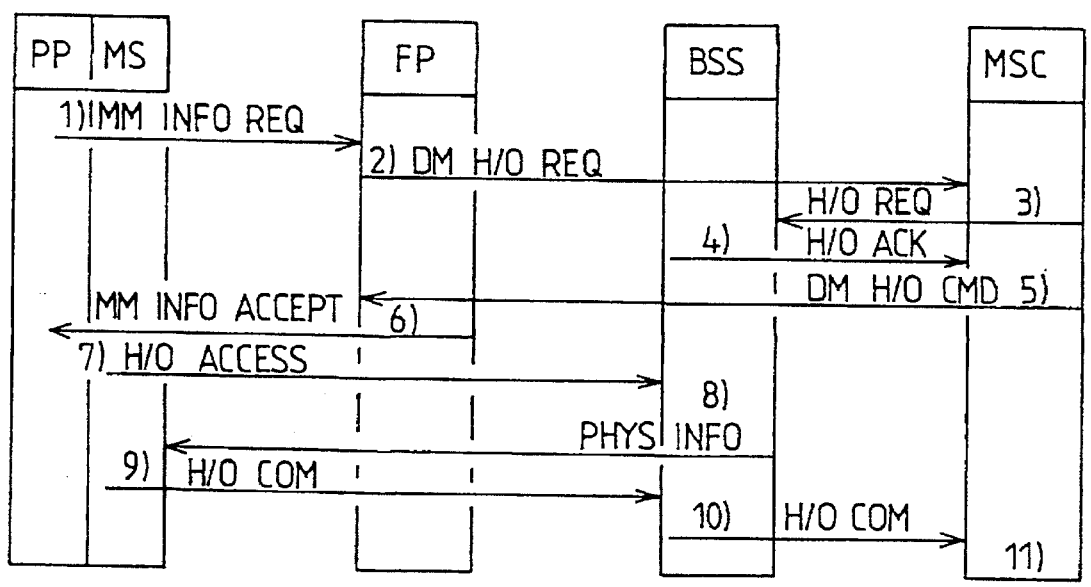
FIG. 3 is a signalling diagram for the handover method according to the invention.

In step 1 of FIG. 3, when detecting during the call that the quality of connection is getting worse, the PP will start a handover procedure from the DECT system to the GSM system. Firstly, the PP will request the stored measurement results from the MS part of the terminal. After obtaining the measurement results, the handover procedure is initiated by sending a MM INFO REQuest message according to the DECT common interface specification (DECT CI) from the PP part of the terminal to the DECT fixed part FP. This message will carry the obtained measurement results in IWU-TO-IWU parameter. The message includes also a portable identity.

In step 2 of FIG. 3, when the DECT fixed part FP receives the MM-INFO-REQ message from PP part of the dual mode terminal, it will send a DM H/O REQuired message according to DSS.1+ protocol to the mobile exchange MSC. The DSS.1+ protocol is the DSS.1protocol enhanced with mobility management. This message includes the following information elements: Portable identity, a Cause field including information of the dual mode handover, and an IWU-TO-IWU parameter including the measurement results.

In step 3 of FIG. 3, the MSC receives the measurement results in the DM H/Q REQ message from DECT fixed part FP. The MSC decides on the basis of the measurement results to which GSM base station BSS it should perform the handover. The MSC sends a H/O REQ message according to specification GSM 08.08 to a base station BSS it has selected for handover, to indicate that the dual mode terminal is to be handed over to that GSM base station BSS.

In step 4 of FIG. 3, H/O ACK message according to the specification GSM 08.08 is sent from the selected GSM base station BSS to the MSC. This message indicates that the request to support a handover at the selected BSS can be supported by this BSS. The message further indicates to which radio channel the dual mode terminal should be directed.

In step 5 of FIG. 3, the MSC sends a DM H/O CMD message according to DSS.1+ protocol to the DECT fixed part FP to indicate that a handover procedure is available. Also, the information of the selected GSM base station BSS is included. Thus, the message includes the following information elements: a portable identity and a BSS identity.

In step 6, the DECT fixed part FP sends to the cordless telephone part PP of the dual mode terminal a MM INFO ACCEPT message according to DECT CI. This message includes information of the selected GSM base station BSS where handover should be done. Thus, this message includes the following information elements: an IWU-TO-IWU parameter, including a BSS identity and a H/O reference.

In step 7, the cordless telephone part PP delivers the identity of the selected GSM base station BSS to the mobile station part MS of the dual mode terminal and the mobile station part MS sends an H/O ACCESS message according to the specification GSM 04.08 to the selected GSM base station BSS.

In step 8, when the selected GSM base station BSS receives the H/O ACCESS message from the mobile station part MS, it will respond with a PHYS INFO message according to the specification GSM 04.08 to the mobile station part MS in order to stop sending of access bursts from the MS and to activate the physical channels for the connection.

In step 9, the mobile station part of the dual mode terminal sends an H/O COMPLETE message according to the specification GSM 08.08 to the MSC to indicate that the mobile station part MS of the dual mode terminal has successfully accessed the selected GSM base station BSS. The mobile station part MS of the dual mode terminal will inform the cordless telephone part PP of the terminal that the handover is completed and the cordless telephone part of the terminal can release the former DECT connection.

We claim:

1. In a mobile telecommunications system including a fixed network comprising a plurality of mobile exchanges, a plurality of first base stations connected to said mobile exchanges and a plurality of second base stations of a cordless telephone system, said second base stations being connected to and under control of said mobile exchanges, dual mode subscriber terminals each having a mobile station part for radio communication with said first base stations and a cordless telephone part for radio communication with said second base stations, a method for performing handover of a respective one dual mode subscriber terminal of said dual mode subscriber terminals from one base station of said second base stations to one base station of said first base stations, comprising the steps of:

measuring the field strengths of said first base stations at said mobile station part of said one dual mode subscriber terminal and storing measurement results, detecting low quality of connection between one of said second base stations and said cordless telephone part of said one dual mode subscriber terminal during an on-going call, obtaining the stored measurement results from said mobile station part by said cordless telephone part of said one dual mode subscriber terminal, sending a message including said obtained measurement results and a terminal identity to said one of said second base stations from said cordless telephone part of said one dual mode subscriber terminal, sending a handover request message from said one of said second base stations to one of said mobile exchanges in response to receipt of said message including said measurement results, said handover request message including said terminal identity and said measurement results, selecting one of said first base stations on the basis of said measurement results, sending a handover command message to said one of said second base stations from said one of said mobile exchanges, said message including the information of said selected one of said first base stations, sending a message to said cordless telephone part of said one dual mode subscriber terminal from said one of said second base stations, and said message including information of said selected one of said first base stations, forwarding said information of said selected one of said first base stations to said mobile station part via said cordless telephone part of said one dual mode subscriber terminal, establishing a connection between said mobile station part of said dual mode terminal and said selected one of said first base stations, and releasing said connection between said cordless telephone part of said one dual mode subscriber terminal and said one of said second base stations.

2. A method according to claim 1, further comprising the steps of:

sending a handover request message to said selected one of said first base stations from said one of said mobile exchanges to indicate that said one dual mode subscriber terminal is to be handed over to said selected base station, and sending a handover acknowledgement message from said selected one of said first base stations to said one of the mobile exchanges, said handover acknowledgement message indicating a radio channel to which said one dual mode subscriber terminal should be directed.

3. A method according to claim 1, wherein said step of establishing a connection comprises the steps of:

sending a handover access message from said mobile station part of said one dual mode subscriber terminal to said selected one of said first base stations, sending an acknowledgement message to said mobile station part from said selected one of said first base stations, sending a handover completed message to said selected one of said first base stations from said mobile station part, and sending a handover completed message from said selected one of said first base stations to said one of said mobile exchanges.

4. In a mobile telecommunications system including a fixed network comprising a plurality of mobile exchanges, a plurality of first base stations connected to said mobile exchanges, and a plurality of second base stations of a cordless telephone system, said second base stations being connected to and under control of said mobile exchanges, a dual mode subscriber terminal comprising:

a mobile station part for radio communication with said first base stations, a cordless telephone part for radio communication with said second base stations, means for measuring the field strengths of said first base stations at said mobile station part of said dual mode subscriber terminal and storing measurement results, means for monitoring the quality of connection between one of the second base stations and said cordless telephone part of said dual mode subscriber terminal during an on-going call, means for requesting said stored measurement results from said mobile station part to said cordless telephone part of said dual mode terminal in response to detecting a lowness in quality of said connection, means for sending a message including said obtained measurement results and a terminal identity to said one of said second base stations from said cordless telephone part of said dual mode subscriber terminal, means for receiving a message at said cordless telephone part of said dual mode terminal from said one of said second base stations, said message including information on the one of said first base stations which is selected for handover, and means for forwarding said information of said selected one of said first base stations to said mobile station part from said cordless telephone part of said dual mode subscriber terminal so as to establish a connection between said mobile station part of said dual mode subscriber terminal and said selected one of said first base stations.

5. A method according to claim 2, wherein said step of establishing a connection comprises the steps of:

sending a handover access message from said mobile station part of said one dual mode subscriber terminal to said selected one of said first base stations, sending an acknowledgement message to said mobile station part from said selected one of said first base station part, and sending a handover completed message from said selected one of said first base stations to said one of said mobile exchanges.

\* \* \* \* \*